United States Patent [19]

Goldfarb et al.

[11] Patent Number: 4,553,435
[45] Date of Patent: Nov. 19, 1985

[54] ELEVATED TRANSIENT TEMPERATURE LEAK TEST FOR UNSTABLE MICROELECTRONIC PACKAGES

[75] Inventors: Harold Goldfarb, Irvine; Kenneth L. Perkins, Yorba Linda; Bernard L. Weigand, Fullerton, all of Calif.

[73] Assignee: The United States of America as represented by the Secretary of the Air Force, Washington, D.C.

[21] Appl. No.: 515,240

[22] Filed: Jul. 19, 1983

[51] Int. Cl.[4] ............................................. G01M 3/20
[52] U.S. Cl. ..................................... 73/40.7; 73/49.3; 374/5
[58] Field of Search .................. 73/40.7, 49.3; 374/44, 374/45, 4, 5

[56] References Cited

U.S. PATENT DOCUMENTS

| | | | |
|---|---|---|---|
| 2,486,199 | 10/1949 | Nier | 73/40.7 |
| 2,608,855 | 9/1952 | Jacobs | 73/40.7 |
| 3,009,012 | 11/1961 | Polese | 174/151 |
| 3,572,096 | 3/1971 | Meyer | 73/40.7 |
| 3,578,758 | 5/1971 | Altshuler | 73/40.7 |
| 3,672,207 | 6/1972 | Cramp et al. | 73/40.7 |
| 3,738,158 | 6/1973 | Farrell et al. | 73/40.7 |
| 3,762,212 | 10/1973 | Morley et al. | 73/40.7 |
| 3,902,068 | 8/1975 | Wood | 250/343 |
| 4,083,223 | 4/1978 | Hashimoto et al. | 73/15 |
| 4,158,960 | 6/1979 | White et al. | 73/40.7 |
| 4,324,285 | 4/1982 | Henderson | 165/2 |
| 4,356,721 | 11/1982 | White et al. | 73/40.7 |

FOREIGN PATENT DOCUMENTS

2000300 1/1979 United Kingdom ................ 73/40.7

Primary Examiner—Stewart J. Levy
Assistant Examiner—Hezron E. Williams
Attorney, Agent, or Firm—Donald J. Singer; Bobby D. Scearce

[57] ABSTRACT

A novel method and apparatus for detecting leaks in glass-to-metal seals of microelectronic devices and the like are described which comprise a double-gasketed vacuum station including a base plate having a central hole and a first gasket for exposing one side of the seals to a leak detector; a vacuum fixture surrounding the device provides a marginal region thereunder which can be evacuated to prevent helium from permeating the first gasket; the vacuum fixture includes a central opening to expose the other side of the seals to a helium-containing atmosphere within a shroud enclosing the device and vacuum fixture; a second gasket provides a seal between the vacuum fixture and device periphery at the central opening in the fixture. For leak tests under controlled time/temperature conditions, an adjacent infrared lamp is used to radiantly heat the package containing the glass-to-metal seals, and a mask is included to avoid direct radiant heating of the gaskets and glass-to-metal seals.

2 Claims, 2 Drawing Figures

4,553,435

ELEVATED TRANSIENT TEMPERATURE LEAK TEST FOR UNSTABLE MICROELECTRONIC PACKAGES

RIGHTS OF THE GOVERNMENT

The invention described herein may be manufactured and used by or for the Government of the United States for all governmental purposes without the payment of any royalty.

BACKGROUND OF THE INVENTION

The present invention relates generally to apparatus and methods for nondestructive testing of electronic devices and, more particularly, to a novel method and apparatus for detecting leaks in glass-to-metal seals in microelectronic devices.

In the fabrication of certain microelectronic or hybrid electronic devices wherein sealing between metallic wires and glass feedthroughs and the body of the device is required, problems are presented in providing hermetic seals between the wires and the glass and between the glass and the body of the device. Suitable method and apparatus for quick and reliable determination, on a 100% quality control basis, of the integrity of the glass-to-metal seals of these devices is required by the manufacturers and/or users of these devices. Because the devices are often subjected to temperature excursions during use, a desirable method would include the detectability of leaks at elevated temperature.

The present invention meets the aforesaid need by providing a method and apparatus for detecting hermetic leaks in devices incorporating glass-to-metal seals, such as may characterize certain microelectronic and hybrid electronic devices. The invention utilizes a double-gasketed vacuum test station to isolate the glass-to-metal seals for exposure on one side of a helium-containing atmosphere and on the other side to an evacuated space monitored by a mass spectrometer helium leak detector to detect leaks through the seals. Controlled heating of the seals is accomplished by exposing the package containing the seals to radiant energy from an infrared lamp, and the seals may be leak tested under conditions of a preselected time/temperature control program.

It is, therefore, a principal object of the present invention to provide an apparatus for leak testing glass-to-metal seals under controlled heating conditions.

It is a further object to provide a quick and reliable method for leak checking glass-to-metal seals of certain electronic devices.

These and other objects of the present invention will become apparent as the detailed description of certain representative embodiments thereof proceeds.

SUMMARY OF THE INVENTION

In accordance with the foregoing principles and objects of the present invention, a novel method and apparatus for detecting leaks in glass-to-metal seals of microelectronic devices and the like are described which comprise a double-gasketed vacuum station including a base plate having a central hole and a first gasket for exposing one side of the seals to a leak detector; a vacuum fixture surrounding the device provides a marginal region therearound which can be evacuated to prevent helium from permeating the first gasket; the vacuum fixture includes a central opening to expose the other side of the seals to a helium-containing atmosphere within a shroud enclosing the device and vacuum fixture; a second gasket provides a seal between the vacuum fixture and device periphery at the central opening in the fixture. For leak tests under controlled time/temperature conditions, an adjacent infrared lamp is used to radiantly heat the package containing the glass-to-metal seals, and a mask is included to avoid direct radiant heating of the gaskets and glass-to-metal seals.

DESCRIPTION OF THE DRAWINGS

The present invention will be more clearly understood from a reading of the following detailed description in conjunction with the accompanying drawings wherein.

DETAILED DESCRIPTION

Figure 1:
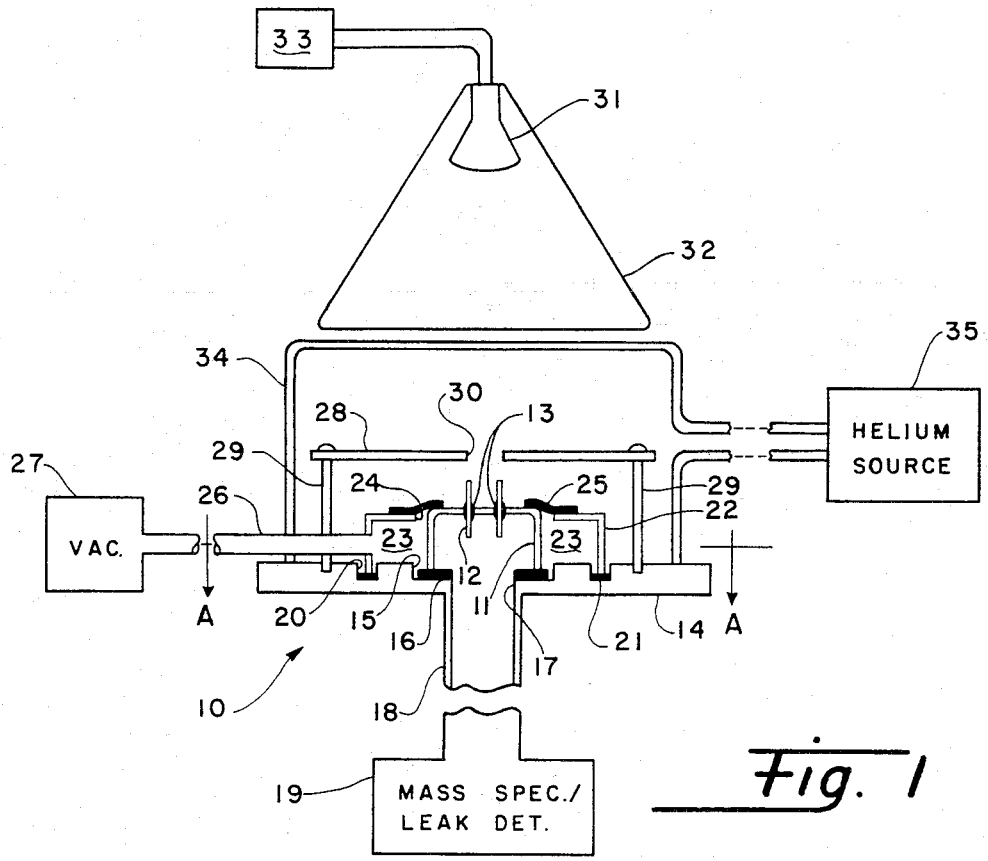
FIG. 1 is an elevational view in partial section of the vacuum test station of the present invention.
Figure 2:
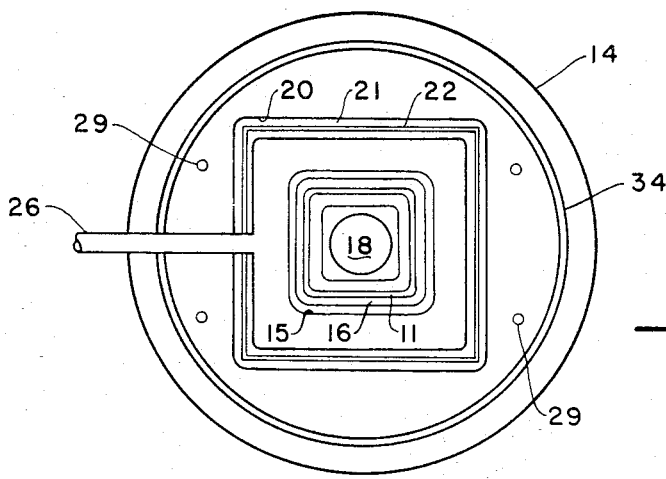
FIG. 2 is a view of the test station of FIG. 1 as viewed along lines A—A thereof.

Referring now to FIG. 1 of the accompanying drawings, shown therein is a schematic of the essential elements of an apparatus for leak testing electronic devices having glass-to-metal seals according to the present invention. The double-gasketed vacuum test station 10 for containing a device 11 is shown in a sectional elevational view; auxiliary equipment is shown schematically. FIG. 2 is a view of the vacuum station 10 of FIG. 1 taken along lines A—A.

Device 11 may contain one or more metallic electrical leads 12 sealed into the device through one or more glass-to-metal seals 13.

Test station 10 comprises a base plate 14 having a central recess 15 for receiving a gasket 16 for providing a primary vacuum seal at the periphery of device 11 substantially as shown. Gasket 16, as well as other gaskets herein used, may be comprised of rubber or other elastomer customarily used for vacuum application. Neoprene gaskets used herein proved to be satisfactory for the desired results. A central hole 17 in plate 14 allows connection of means in the form of conduit 18 whereby one side of the seals 13 may be exposed to a leak detector 19, mass spectrometer, or other helium detector operatively connected to plate 14. The operation of leak detector 19 comprises drawing a vacuum on the inlet thereof (represented by conduit 18), which serves to pressure seal device 11 to gasket 16.

A groove 20 is provided in the upper surface of plate 14 for receiving a gasket 21. In the test station 10 built in demonstration of the invention, recess 15, gasket 16, groove 20 and gasket 21 were generally rectangular in shape as suggested in the view of FIG. 2, to accommodate a generally rectangularly-shaped microelectronic package comprising the device 11 being leak tested.

A vacuum fixture 22 is sized to substantially enclose device 11 and provides a marginal space 23 surrounding device 11 substantially as shown in FIG. 1. Fixture 22 has a central opening 24 in the top thereof to expose that portion of device 11 containing electrical leads 12 and glass-to-metal seals 13. Gasket 21 provides the seal between the periphery of vacuum fixture 22 and base plate 14. A third gasket 25 provides a seal between vacuum fixture 22 and the surface of device 11 at central opening 24. A vacuum line 26 connects vacuum fixture 22 to a vacuum pump 27 so that marginal space 23 may be evacuated as hereinafter described.

Since the devices 11 are often subjected to elevated temperatures during use, it may be desirable to leak check them during controlled temperature excursions. Devices 11 having seals 13 which leak only under heat induced stress may thereby be detected. In order to accomplish this, an infrared mask 28 may be supported in a spaced relationship by posts 29 from plate 14 and may include a central hole 30 whereby that portion of device 11 between seals 13 may be exposed to a source of infrared light 31. Infrared source (lamp) 31 may therefore provide controlled radiant heating of the device 11 without substantial heating of the glass-to-metal seals 13 or the gaskets 25, 21, 16, since heating of the gaskets may increase their helium permeability. Reflector 32 may be included to direct radiation from source 31 onto device 11 through mask 28. The infrared source 31 may be time and temperature controlled by power control means 33 (shown schematically) external of test station 10. A shroud or envelope 34 of glass or quartz rests on base plate 14 surrounding mask 28, and is connected to a source 35 of helium to provide an atmosphere of helium surrounding vacuum fixture 22 and the exposed portion of device 11. In the arrangement shown, a substantial seal between shroud 34 and base plate 14 is ordinarily not required for testing of devices 11 as hereinafter described. Shroud 34 is substantially transparent to the radiation from source 31 to facilitate the controlled heating of device 11 by infrared illumination.

The test station 10 as just described provides the means to detect helium leakage through microcracks in glass-to-metal seals in electronic devices, and may be used for such leak tests during temperature excursions imposed on the device without interference by helium gas permeation through the primary gasket seal (FIG. 1, element 16) to the leak detector 19. The double-gasketing configuration (viz. gaskets 16 and 21 cooperating with 25) isolates seals 13 for test by providing a region 23 surrounding device 11 from which any helium present is swept away by vacuum 27 to prevent helium permeation through (primary) gasket 16. A true measurement of the leakage, if any, through glass-to-metal seals 13 can then be made. An infrared lamp 31 having an output rating of about 650 watts at 120 volts provided a sufficient energy source to heat devices 11 from room temperature to about 200° C. in about 30 seconds. Cooldown time following switchoff of source 31 within about 60 seconds was achieved resulting in a total test time for a device 11 of about two minutes.

Having thus described the apparatus in a representative embodiment useful in the practice of the invention herein, leak testing of an electronic device 11 may be performed according to the following procedure.

a. Place device 11 on base plate 14 with gasket 16 in place and initiate operation of leak detector 19 including pulling a vacuum on conduit 18 to seal device 11 on gasket 16;

b. Place vacuum fixture 22 including gasket 25 in place over device 11 and evacuate marginal space 23 using vacuum pump 27;

c. Install infrared mask 28;

d. Place shroud 34 connected to helium source 35 over the aforesaid assembly and initiate helium flow thereinto;

e. Initiate controlled time/temperature heating of device 11 from room temperature to a preselected maximum temperature using infrared lamp 31; switch off lamp at the preselected maximum temperature;

f. Monitor the helium leak rate during the entire temperature excursion during heating of device 11 and cooling after lamp 31 is switched off;

g. Repeat the foregoing using another device 11.

The foregoing test procedure can be performed relatively quickly for a device 11 (viz. one to two minutes), depending on the wattage of lamp 31 and the desired preselected test temperature profile. The described apparatus and method may therefore be useful for 100% quality control check of the integrity of the glass-to-metal seals of devices 11. Actual leak rate tests on a plurality of devices 11 in the form of 0.6 inch diameter TO-8 packages and 1.25 inch X 1.25 inch plug-in or uniwall (vertical leaded) packages subjected to transient temperature excursions from about 20° C. to about 150° C. demonstrated the utility of the apparatus and method herein described in detecting leaks of the order of $10^{-9}$ std atm cc/sec (air). The detectability is limited only by the helium permeation of the primary gasket 16 seal.

The present invention, as hereinabove described, provides a novel method and apparatus for detecting hermetic leaks in glass-to-metal seals in devices such as certain electronic devices. It is understood that certain modifications to the invention as described may be made, as might occur to one with skill in the applicable field of this invention, within the intended scope of the appended claims. Therefore, all embodiments contemplated hereunder have not been shown in complete detail. Other embodiments may be developed without departing from the spirit of this invention or from the scope of the appended claims.

We claim:

1. Apparatus for detecting leaks through glass-to-metal seals in an electronic device or the like, comprising:

a. a substantially flat base plate having upper and lower surfaces and including means defining a first central opening therethrough between said upper and lower surfaces;

b. a first annular gasket on said upper surface of said plate surrounding said first opening for sealably supporting said device around a peripheral portion thereof;

c. helium detector means operatively connected to said lower surface of said plate at said first opening, said helium detector means including a source of vacuum providing a first vacuum seal between said device and said first gasket and whereby a first side of said glass-to-metal seals of said device is exposed to said helium detector means;

d. a source of helium;

e. a shroud, supported by said plate and enclosing said device, and conduit means operatively connecting said shroud to said source of helium for providing an atmosphere containing helium over said device at the second side of said glass-to-metal seals;

f. a vacuum fixture supported by said plate intermediate said shroud and device and defining a marginal space around said device, said vacuum fixture having a second opening for exposing the second side of said glass-to-metal seals of said device to said helium containing atmosphere within said shroud;

g. a second annular gasket between the contacting surfaces of said vacuum fixture and said plate;

h. a third annular gasket attached to said vacuum fixture at said second opening for providing a second vacuum seal between said vacuum fixture and said device around a peripheral portion of said device around said second side of said glass-to-metal seals; and i. a source of vacuum operatively connected to said vacuum fixture for evacuating said marginal space around said device and thereby providing said second vacuum seal between said vacuum fixture and said device at said third gasket and a third vacuum seal between said vacuum fixture and said plate at said second gasket by the pressure difference between the vacuum maintained within said marginal space and the pressure of said helium containing atmosphere, and for preventing said helium from permeating said third seal between said device and said plate at said first gasket.

2. The apparatus as recited in claim 1 further comprising a controllable source of infrared radiant energy adjacent said shroud for controllably heating said device, and a mask, intermediate said radiant energy source and said device, and having a third central opening therein, said third opening sized to direct said radiant energy onto said device and for shielding said gaskets from direct exposure to said source, and wherein said shroud is substantially transparent to said infrared radiant energy.

* * * * *